US008289852B2

(12) United States Patent
Vivanco et al.

(10) Patent No.: US 8,289,852 B2
(45) Date of Patent: Oct. 16, 2012

(54) SETTING TOKEN BUCKET PARAMETERS FOR SCHEDULING OF AIR-INTERFACE RESOURCES

(75) Inventors: Daniel A. Vivanco, Herndon, VA (US); Esmail Hejazi Dinan, Herndon, VA (US); Vijay Rudraraju, Herndon, VA (US); Howard Bishop Anderson, Ashburn, VA (US); Hemanth Balaji Pawar, Herndon, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 639 days.

(21) Appl. No.: 12/388,038

(22) Filed: Feb. 18, 2009

(65) Prior Publication Data

US 2010/0208665 A1 Aug. 19, 2010

(51) Int. Cl.
*H04L 12/26* (2006.01)
(52) U.S. Cl. ............ 370/235.1; 370/329; 709/226; 709/233
(58) Field of Classification Search .......... 370/229, 370/230.1, 235, 235.1, 310, 322, 329, 330, 370/341, 348; 709/223, 226, 232–235
See application file for complete search history.

(56) References Cited

U.S. PATENT DOCUMENTS

| | | | |
|---|---|---|---|
| 5,604,731 A | 2/1997 | Grossglauser et al. | |
| 6,801,500 B1 | 10/2004 | Chandran | |
| 6,862,265 B1 * | 3/2005 | Appala et al. | 370/235 |
| 6,961,539 B2 * | 11/2005 | Schweinhart et al. | 370/229 |
| 7,330,433 B2 * | 2/2008 | Shao et al. | 370/235 |
| 7,369,489 B1 | 5/2008 | Bhattacharya et al. | |
| 7,499,401 B2 * | 3/2009 | Buddhikot et al. | 370/235 |
| 8,174,982 B2 * | 5/2012 | Buddhikot et al. | 370/235 |
| 2002/0075805 A1 * | 6/2002 | Gupta et al. | 370/235 |
| 2003/0163581 A1 * | 8/2003 | Moran et al. | 709/235 |
| 2003/0189900 A1 * | 10/2003 | Barany et al. | 370/229 |
| 2006/0039346 A1 | 2/2006 | Shapiro | |
| 2007/0115817 A1 | 5/2007 | Gupta et al. | |
| 2007/0153682 A1 * | 7/2007 | Swenson et al. | 370/229 |
| 2007/0165529 A1 * | 7/2007 | Nakamura et al. | 370/235 |
| 2008/0192632 A1 * | 8/2008 | Bader | 370/230.1 |
| 2009/0046642 A1 * | 2/2009 | Damnjanovic | 370/329 |
| 2009/0257392 A1 * | 10/2009 | Hosein | 370/329 |
| 2010/0135229 A1 * | 6/2010 | Lohr et al. | 370/329 |

OTHER PUBLICATIONS

Bor-Jiunn Hwang; I-Shyan Hwang; Bo-Feng Guo; Ruey-Rong Su; , "A Novel Radio Resource Management Scheme with HPWRR Scheduling Algorithm in Link Adaptive Mobile WiMAX Network," Asia-Pacific Services Computing Conference, 2008. APSCC '08. IEEE , vol., No., pp. 225-230, Dec. 9-12, 2008.*

* cited by examiner

*Primary Examiner* — Jeffrey M Rutkowski
(74) *Attorney, Agent, or Firm* — O'Brien Jones, PLLC

(57) ABSTRACT

A method of scheduling air-interface resources is disclosed. A throughput indicator associated with a wireless device is received. A modulation and coding scheme indicator is received. The modulation and coding scheme indicator being associated with a modulation and coding scheme recently used by the wireless device. Based on the modulation and coding scheme indicator, a token bucket size for a token bucket is selected. Based on the throughput indicator, a token rate for the token bucket is received. An air-interface resource is allocated to the wireless device based on the token bucket.

20 Claims, 5 Drawing Sheets

SETTING TOKEN BUCKET PARAMETERS FOR SCHEDULING OF AIR-INTERFACE RESOURCES

TECHNICAL BACKGROUND

Wireless communication may be used as a means of accessing a network. Wireless communication has certain advantages over wired communications for accessing a network. One of those advantages is a lower cost of infrastructure to provide access to many separate locations or addresses compared to wired communications. This is the so-called "last mile" problem. Another advantage is mobility. Wireless communication devices, such as cell phones, are not tied by wires to a fixed location. To use wireless communication to access a network, a customer needs to have at least one transceiver in active communication with another transceiver that is connected to the network.

To facilitate wireless communications, the Institute of Electrical and Electronics Engineers (IEEE) has promulgated a number of wireless standards. These include the 802.11 (WiFi) standards and the 802.16 (WiMAX) standards. Likewise, the International Telecommunication Union (ITU) has promulgated standards to facilitate wireless communications. This includes TIA-856, which is also known as Evolution-Data Optimized (EV-DO). The European Telecommunications Standards Institute (ETSI) has also promulgated a standard known a long term evolution (LTE). Additional standards such as the fourth generation communication system (4G) are also being pursued.

All of these standards pursue the aim of providing a comprehensive IP solution where voice, data, and streamed multimedia can be given to users on an "anytime, anywhere" basis. These standards also aim to provide higher data rates than previous generations. All of these standards may include specifications for various aspects of wireless communication with a network including processes for registering on the network, carrier modulation, frequency bands of operation, and message formats.

OVERVIEW

A method of scheduling air-interface resources is disclosed. A throughput indicator associated with a wireless device is received. A modulation and coding scheme indicator is received. The modulation and coding scheme indicator being associated with a modulation and coding scheme used by the wireless device. Based on the modulation and coding scheme indicator, a token bucket size for a token bucket is selected. Based on the throughput indicator, a token rate for the token bucket is received. An air-interface resource is allocated to the wireless device based on the token bucket.

A method of regulating a utilization of air-interface resources is disclosed. An indicator of a utilization limit associated with a wireless device is received. An indicator of an information flow rate associated with the wireless device is received. An air-interface resource allocation associated with the utilization limit and the information flow rate is determined. Based on the air-interface resource allocation, a token rate for a token bucket associated with the wireless device is determined. A token bucket size for the token bucket is determined. Based on the token bucket, an air-interface resource is allocated to the wireless device.

A communication system is disclosed. An air-interface communicates with a wireless device. The wireless device is associated with an air-interface utilization limit. A scheduler allocates an air-interface resource to the wireless device based on the air-interface utilization limit. The scheduler allocates the air-interface resource based on a token bucket. The scheduler determines a token bucket rate based on the air-interface utilization limit. The scheduler determines a token bucket size based on a selected burst size.

DETAILED DESCRIPTION

In an embodiment, a token bucket is used to schedule air-interface resources. In particular, the token bucket is used to schedule uplink or downlink allocations of time and frequency. These allocations of time and frequency are also known as slots.

The token rate given to a wireless device may be based on a profile associated with that device and the current modulation and coding scheme (MCS) the wireless device is using. For example, "gold" subscribers may be associated with a maximum throughput of 3 Mbps. Thus, if the gold subscriber device is using 64 QAM 5/6 which provides 240 bits per slot, this gold subscriber may be given a token rate of 12,500 slots per second (12,500×240=3 Mbps).

The token bucket size given to a wireless device may also be based on the wireless device profile, utilized MCS, and a burst size. The burst size may be based on both the wireless device profile and MCS. Thus, a high priority user may receive a larger token bucket size than a low priority user. In addition, a wireless device using a good (i.e., high throughput) MCS may receive a larger token bucket size than a wireless device using a less favorable MCS. This allows the high throughput wireless device to burst at higher speeds in order to complete its transfer faster, thereby releasing network resources sooner.

The token rate and token bucket size may also be affected by a "bias factor" that depends on the air-interface utilization and contributions of other subscribers. Thus, if the network is highly loaded, the bias factor will be set to reduce the token rates and token bucket sizes so that it is less likely a wireless device will be able to burst above the maximum throughput associated with it profile. If the network is lightly loaded, the bias factor will be set to increase the token rates and token bucket sizes so that it is more likely a wireless device will be able to burst above the maximum throughput associated with it profile.

Figure 1:
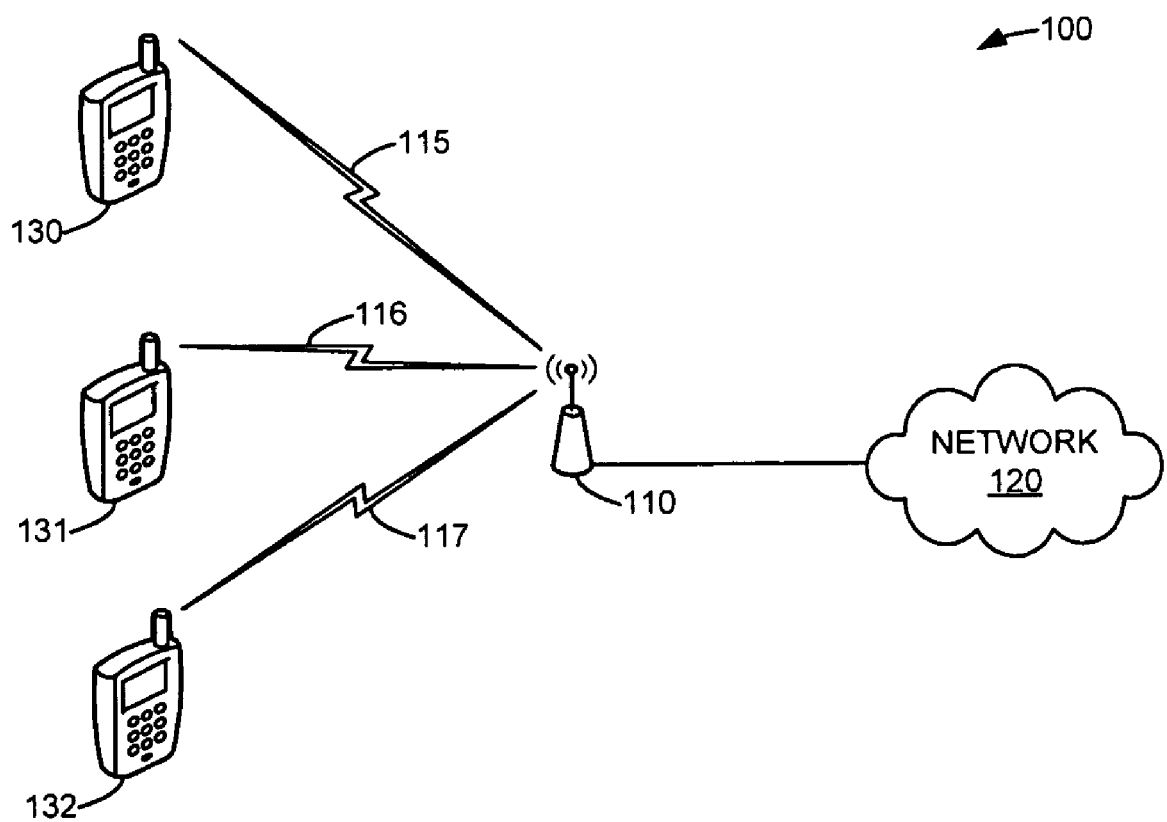
FIG. 1 is a block diagram illustrating a communication system.

FIG. 1 is a block diagram illustrating a communication system. Communication system 100 comprises base station 110, network 120, wireless device 130, wireless device 131, and wireless device 132. Base station 110 is operatively coupled to network 120. Base station 110 is operatively coupled to wireless device 130 via wireless link 115. Base station 110 is operatively coupled to wireless device 131 via wireless link 116. Base station 110 is operatively coupled to wireless device 132 via wireless link 117. Thus, wireless devices 130, 131, and 132 may be operatively coupled to network 120 via base station 110 and wireless links 115, 116, and 117, respectively.

Base station 110 may be any wireless system that provides an air interface to wireless devices 130-132 and operatively couples them to network 120. Examples of base station 110 include, base transceiver stations (BTSs), radio base stations (RBSs), Node B, enhanced Node B (eNBs) and others. Base station 110 may include a number of elements known to those skilled in the art comprising a transceiver, power amplifier, combiner, duplexer, antenna and control function.

Wireless devices 130-132 may each be any device, system, combination of devices, or other such communication platform capable of communicating wirelessly with base station 110. Wireless devices 130-132 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data with network 120 via base station 110. Other types of communication platforms are possible. In an embodiment, a set of modulation coding scheme that wireless devices 130-132 use to communicate with base station 110 via wireless links 115-117 may include one or more of: QPSK 1/2; QPSK 3/4; 16 QAM 1/2; 16 QAM 3/4; 64 QAM 1/2; 64 QAM 2/3; 64 QAM 3/4; and, 64 QAM 5/6.

Network 120 may be any network or collection of networks that couple, link, or otherwise operatively connect wireless devices 130-132 with each other or other devices or systems. Network 120 may include other secondary data networks. In an example, network 120 may include a backhaul network, a local network, a long distance network, or a packet network, or any combination thereof, as well as other types of networks. In an example, communication network 120 may be, or include all or parts of an IEEE 802.16 (WiMAX) specified system. These parts may include other base stations (BSs); an access services network (ASN); or connectivity service network (CSN).

In an embodiment, base station 110 may utilize a token bucket algorithm to schedule air interface resources to wireless devices 130-132. The token bucket is a control mechanism that dictates when slots can be allocated to a wireless device 130-132, based on the presence of tokens in an abstract container (the bucket). The bucket contains tokens, each of which may represent an air-interface resource unit of a predetermined size—for example, 1 slot. Tokens in the bucket are effectively removed for the ability to utilize a slot. When tokens are present, a wireless device 130-132 is allowed an allocation of slots. If there are no tokens in the bucket, a wireless device 130-132 will not be given an allocation of slots and thus cannot communicate packets.

Tokens are added to the bucket at a token rate (r). A bucket can hold at most b tokens. If a token is to be added when the bucket is full, it is discarded. Likewise, if the bucket size is reduced, tokens that can no longer fit in the bucket are discarded. Thus, the token bucket allows allocations of up to the bucket size (b) number of slots, but over the long run, the allocation of slots is limited to the constant token rate, r. Therefore, wireless devices 130-132 may communicate at rates up to their peak burst rates if there are adequate tokens in their associated token buckets.

The token bucket algorithm may be implemented on base station 110 in a scheduler or air-interface map generator. The token bucket rate and the token bucket size may be based on the number of slots required to reach a maximum throughput based on, for a particular wireless device 130-132, an associated profile, an associated quality of service, the MCS being used by that device. The token bucket rate and the token bucket size may also be based on the air-interface utilization associated with base station 110 and/or the probability of the wireless device achieving its maximum throughput.

For example, wireless device 130 may be associated with a "gold" profile. A gold profile may be associated with a maximum throughput of 3 Mbps. Wireless device 131 may be associated with a "silver" profile. A silver profile may be associated with a maximum throughput of 2 Mbps. Wireless device 132 may be associated with a "bronze" profile. A bronze profile may be associated with a maximum throughput of 1 Mbps.

Wireless device 130 may be utilizing 64 QAM 5/6 to communicate with base station 110. Since 64 QAM 5/6 carries 5 bits per symbol, there are 48 symbols in each slot, and wireless device 130 is associated with a profile that provides for 3 Mbps maximum throughput, then base station 110 may select a token rate (r) for wireless device 130 of 12,500 slots/s according to the formula:

$$r = \frac{\text{maximum throughput}}{(MCS \text{ bits per symbol})(\text{symbols per slot})} = \frac{3 Mbps}{(5)(48)} = 12,500 \frac{\text{slots}}{s}.$$

Wireless device 131 may be utilizing 16 QAM 3/4 to communicate with base station 110. Since 16 QAM 3/4 carries 3 bits per symbol, there are 48 symbols in each slot, and wireless device 131 is associated with a profile that provides for 2 Mbps maximum throughput, then base station 110 may select a token rate of approximately 13,890 slots/s. Finally, wireless device 132 may be utilizing QPSK 1/2 to communicate with base station 110. Since QPSK 1/2 carries 1 bit per symbol, there are 48 symbols in each slot, and wireless device 132 is associated with a profile that provides for 1 Mbps maximum throughput, then base station 110 may select a token rate of approximately 20,830 slots/s. It should be noted that, depending upon the MCSs being utilized by wireless devices 130-132, a wireless device associated with a lower throughput may receive a higher token rate. Thus, under this scheme a wireless device 130-132 associated with a lower throughput may receive more slots per second (or per frame) than a wireless device 130-132 associated with a higher throughput.

In addition to selecting a token rate based on a profile (and thus, throughput) associated with a wireless device 130-132, base station 110 may select a bucket size based on the profile associated with a wireless device 130-132. The bucket size selected may be selected from a set of predetermined burst sizes (or burst profiles). The bucket size may be selected as a multiple of the token rate. The bucket size selected may be a larger multiple for higher priority users than lower priority users. For example, gold devices may be given a bucket size that is twelve times their token rate. Silver devices may be given a bucket size that is only ten times their token rate. This may be done to reflect the fact that gold devices have a higher priority than silver devices. Bronze devices may be given a bucket size that is only eight times their token rate. This may be done to reflect the fact that bronze devices have a lower priority than both gold devices and silver devices.

Continuing the preceding example, for gold wireless device 130, base station 110 may select a bucket size that is 150,000 slots (12,500×12=150,000). For silver wireless device 131, base station 110 may select a bucket size that is 138,900 slots (13,890×10=138,900). Finally, for bronze wireless device 132, base station 110 may select a bucket size that is 166,600 slots (20,830×8=166,600). Thus, it should be noted that a wireless device 130-132 associated with a lower priority (or throughput) may receive a larger token bucket size than a wireless device 130-132 associated with a higher priority (or throughput). Thus, a wireless device 130-132 associated with lower throughput (or priority) may burst more slots per second (or per frame) than a wireless device 130-132 associated with a higher throughput (or priority).

Base station 110 may select a token bucket size based on an indicator of a quality of service (QoS) associated with a wireless device 130-132. For example, for WiMAX wireless communication, there are wireless traffic quality of service classifications that include: unsolicited grant service (UGS), real time polling service (rtPS), extended real time polling service (ertPS), non-real time polling service (nRTPS), and best effort (BE). These QoS classifications may be associated with one or more service flows associated with a wireless device 130-132. Thus, base station 110 may select a token bucket size such that wireless devices 130-132 associated with higher priority service flows, such as UGS, receive larger bucket sizes. For example, a wireless device 130 may be associated with a UGS service flow. As a result, wireless device 130 may be given a bucket size that is five times its token rate. Wireless device 132 may be associated with a BE service flow. As a result, wireless device 132 may be given a token bucket size that is only equal to its token rate per second. This may be done to reflect the fact that UGS service flows have a higher priority than BE service flows.

Base station 110 may select a token bucket size based on a burst size. In other words, the token bucket size may be selected based on a maximum burst size chosen in light of a QoS, profile, or MCS, independent of the token rate. For example, a one of wireless devices 130-132 using 16 QAM 3/4 may be assigned a token bucket size of 150,000 slots regardless of its associated token rate or QoS. In another example, a one of wireless devices 130-132 associated with BE service flows may be assigned a token bucket size of 100,000 slots regardless of its token rate or MCS, and so on. Other combinations are possible.

When a one of wireless device 130-132 changes MCS, base station 110 may select new values for the associated token bucket rate and the associated token bucket size. These new values may be selected as described previously. Base station 110 may select a token bucket size based on the MCS associated with the one of wireless devices 130-132. For example, base station 110 may select a token bucket size such that, all other things being equal, a one of wireless devices 130-132 associated with good (i.e., high throughput per slot) MCS will receive a larger token bucket size than wireless devices 130-132 associated with poorer MCSs. This allows wireless devices 130-132 associated with good MCSs to burst longer than wireless devices 130-132 that are associated with poorer MCSs. This allows the wireless device 130-132 associated with good MCSs to completing their transfers faster, thereby release network resources (such as air-interface slots) sooner.

To illustrate, consider an example case where wireless device 130 and wireless device 131 are both associated with the gold profile. Wireless device 130 is communicating using 64 QAM 5/6. Wireless device 131 is using 16 QAM 3/4. Thus, the token rate for wireless device 130 may be selected as 12,500 slots/s. The token rate for wireless device 131 may be selected as 20,830 slots/s. Because wireless device 131 is associated with 16 QAM 3/4, its bucket size may be selected based on a token rate multiplier of 10. Thus, the token bucket size for wireless device 131 may be selected to be 200,830 slots. Because wireless device 130 is associated with a better MCS than wireless device 131, the bucket size selected for wireless device 130 may be selected based on a token rate multiplier of 20. Thus, the token bucket size for wireless device 130 may be selected to be 250,000 slots.

The token rate and token bucket size may also be selected based on a probability one or more of wireless device 130-132 will reach or exceed a maximum throughput. This probability may depend on the utilization of a network resource, such as air-interface slot utilization. The network resource utilization may depend upon the contributions of all the wireless devices 130-132 associated with base station 110.

A bias factor ($\zeta$) may be selected for all, or each individual one of, wireless devices 130-132 based on the utilization of a network resource. For example, a bias factor may be selected based on the air-interface slot utilization associated with base station 110. This bias factor may be selected based on an instantaneous air-interface slot utilization associated with base station 110. The bias factor may be selected based on a running average of the air-interface slot utilization associated with base station 110.

A bias factor that is greater than one (i.e., $\zeta>1$) helps allow a wireless device 130-132 to reach or exceed a maximum throughput even if the network resource is heavily utilized. A bias factor that is less than one (i.e., $\zeta<1$) helps prevent a wireless device 130-132 from reaching a maximum throughput. This lowers the utilization of the network resource. To accomplish this, the bias factor may be multiplied by the token rate, token bucket size, or both. Thus, a bias factor of two (i.e., $\zeta=2$) would double the token rate, token bucket size, or both. Bias factors may be assigned individually to each wireless device 130-132 based on a profile (e.g., gold, silver, etc.). A single bias factor may be assigned to all wireless devices 130-132 associated with base station 110.

Figure 2:
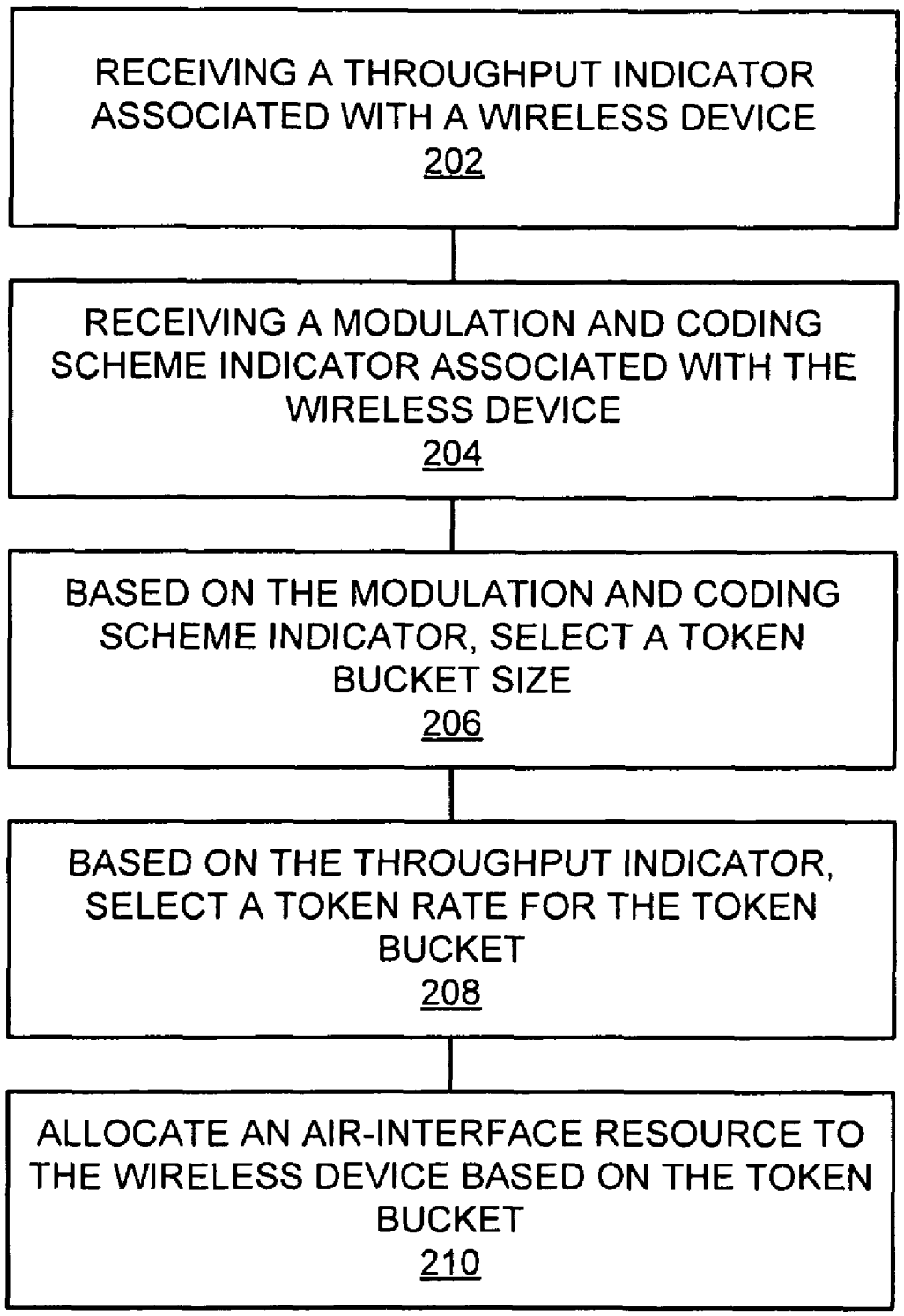
FIG. 2 is a flowchart illustrating a method of operating a communication system.

FIG. 2 is a flowchart illustrating a method of operating a communication system. The steps illustrated in FIG. 2 may be performed by one or more elements of communication system 100.

A wireless throughput indicator associated with a wireless device is received (202). For example, base station 110 may receive an indicator that wireless device 130 is associated with a profile that has a maximum throughput of 3 Mbps. A modulation and coding scheme indicator associated with the wireless device is received (204). For example, base station 110 may determine, or receive, an indicator that wireless device 130 is using 64 QAM 3/4.

Based on the modulation and coding scheme indicator, a token bucket size is selected (206). For example, because wireless device 130 is using 64 QAM 3/4, base station 110 may select a predetermined token bucket size. In another example, because wireless device 130 is using 64 QAM 3/4, base station 110 may select token bucket size that is twelve times the token rate. Other selections that are based on the modulation and coding scheme are possible.

Based on the throughput indicator, select a token rate for the token bucket (208). For example, based on the profile associated with wireless device 130, base station 110 may select a predetermined token rate. In another example, based on the profile associated with wireless device 130, base station 110 may select a token rate that, based on the modulation and coding scheme associated with wireless device 130, will provide approximately the maximum throughput associated with wireless device 130.

An air-interface resource is allocated to the wireless device based on the token bucket (210). For example, base station 110 may allocate air-interface slots to wireless device 130 based on a token bucket. The token rate of this token bucket may be determined in block 208. The token bucket size of this token bucket may be determined in block 206.

Figure 3:
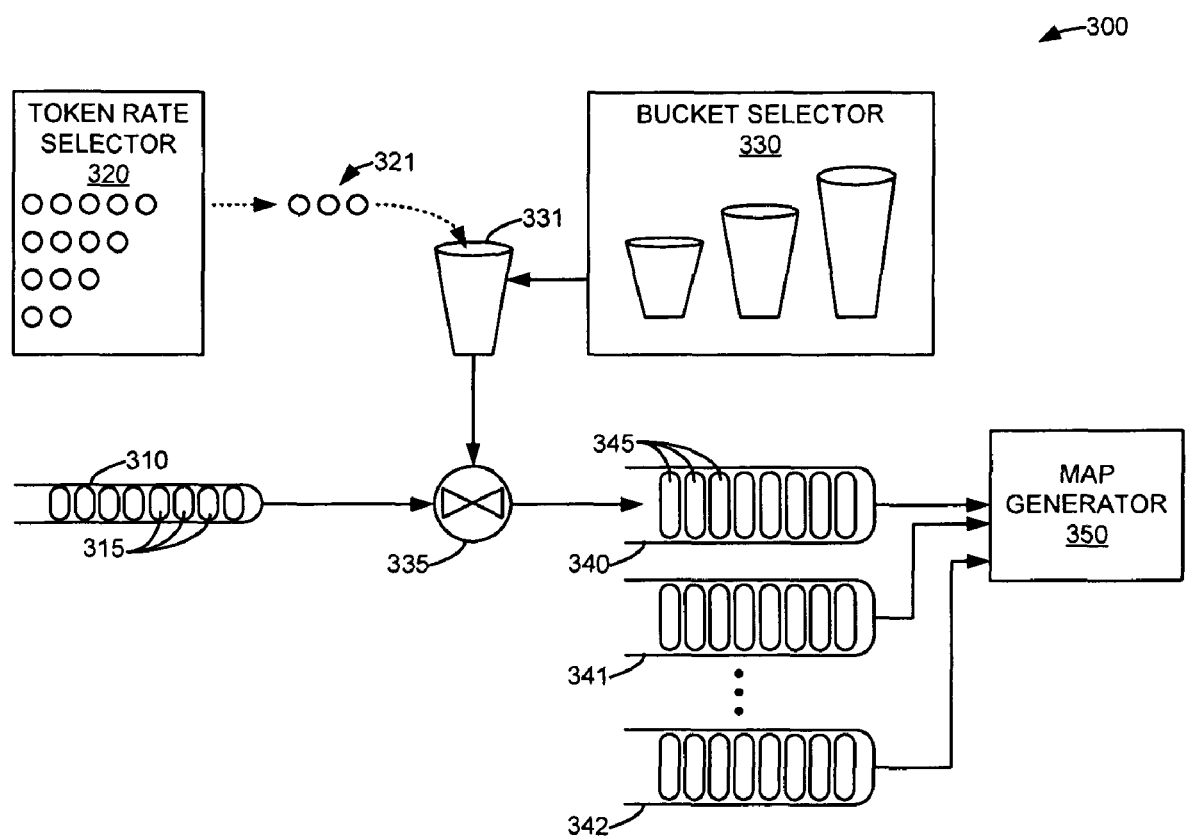
FIG. 3 is a diagram illustrating an air-interface scheduler.

FIG. 3 is a diagram illustrating an air-interface scheduler. Scheduler 300 comprises: resource request queue 310, resource requests 315, token rate selector 320, tokens 321, bucket selector 330, bucket 331, gating function 335, granted allocation queues 340, 341, and 342, allocations 345, and map generator 350. Token rate selector 320 determines the rate that tokens 321 are sent to bucket 331. Bucket selector 330 determines the size of bucket 331. Gating function 335 receives resource requests 315 from resource request queue 310. If there is a token in bucket 331, gating function places an allocation 315 into a one of granted allocation queues 340-342. Map generator 350 receives allocations from granted allocation queues 340-342 to produce allocation maps. In an embodiment, allocation maps specify the allocation of air-interface slots. Maps may be communicated to wireless devices. For example, maps may be communicated to one or more of wireless devices 130-132.

In an embodiment, token rate selector 320 may base the token rate on the number of slots required to reach a maximum throughput. Token rate selector 320 may select the token rate based on a profile and an MCS being used by a device. Token rate selector 320 may base the token rate on an air-interface utilization and the probability of a wireless device achieving its maximum throughput. Bucket selector 330 may base the size of bucket 331 on the token rate. The token rate and the token bucket size may also be based on the air-interface utilization associated with base station 110 and the probability of the wireless device achieving its maximum throughput. Bucket selector 330 may base the size of bucket 331 on an air-interface utilization and the probability of a wireless device achieving its maximum throughput.

For example, a wireless device associated with resource request queue 310 may be associated with a "gold" profile. A gold profile may be associated with a maximum throughput of 3 Mbps. This wireless device may be utilizing 64 QAM 5/6. Since 64 QAM 5/6 carries 5 bits per symbol, and there are 48 symbols in each slot, and the wireless device is associated with a profile that provides for 3 Mbps maximum throughput, token rate selector 320 may select a token rate of 12,500 slots/s according to the formula:

$$r = \frac{\text{maximum throughput}}{(MCS \text{ bits per symbol})(\text{symbols per slot})} = \frac{3 Mbps}{(5)(48)} = 12,500 \frac{\text{slots}}{s}.$$

In an embodiment, bucket selector 330 may select the size of bucket 331 based on a profile (and thus, throughput) associated with a wireless device. The bucket size may be selected from a predetermined set of burst sizes (or burst profiles). The bucket size may be selected as a multiple of the token rate selected by token rate selector 320. The bucket size may be larger multiple for higher priority users than lower priority users. For example, resource request queues (e.g., 310) associated with gold profile devices may be given a bucket size that is twelve times their token rate. Resource request queues associated with silver devices may be given a bucket size that is only ten times their token rate. This may be done to reflect the fact that gold devices have a higher priority than silver devices.

Bucket selector 330 may select a token bucket size for bucket 331 based on an indicator of a quality of service (QoS) associated with a resource request queue 310. QoS classifications may be associated with one or more service flows associated with a resource request queue 310. Thus, bucket selector 330 may select a token bucket size for bucket 331 such that resource request queue 310, which is associated with a higher priority service flow, such as UGS, receives a larger bucket size than other resource request queues.

Bucket selector 330 may select a token bucket size based on a burst size. In other words, the token bucket size for bucket 331 may be selected based on a maximum burst size chosen in light of a QoS, profile, or MCS independent of the token rate. For example, resource request queue 310 which is associated with a device using 16 QAM 3/4 may be assigned a token bucket size of 150,000 slots. This assignment may be made regardless of the associated token rate or QoS. In another example, resource request queue 310, which is associated with a BE service flow, may be assigned a token bucket size of 100,000 slots. This assignment may be made regardless of the token rate, or MCS, and so on. Other combinations are possible.

When a resource request queue changes the MCS it is associated with, bucket selector 330 may select a new value for the size of bucket 331. Token rate selector 320 may select a new value for the token rate. These new values may be selected as described previously. Bucket selector 330 may select a size for bucket 331 based on the MCS associated with a resource request queue 310. For example, bucket selector 330 may select a bucket size for bucket 331 such that, all other things being equal, resource request queue 310 being associated with a good (i.e., high throughput per slot) MCS will result in a larger token bucket size for bucket 331 than it would if resource request queue 310 were associated with a poorer MCS.

Token rate selector 320 and bucket selector 330 may also base their selections on a probability that a resource request queue 310 will reach or exceed a maximum throughput. This probability may depend on the utilization of a network resource, such as air-interface slot utilization. The network resource utilization may depend upon the contributions of other resource request queues (not shown).

A bias factor (ζ) may be selected for resource request queue 310 based on the utilization of a network resource. For example, a bias factor may be selected based on an air-interface slot utilization. This bias factor may be selected based on an instantaneous air-interface slot utilization. The bias factor may be selected based on a running average of an air-interface slot utilization.

A bias factor that is greater than one (i.e., ζ>1) helps allow resource request queue 310 to reach or exceed a maximum throughput even if the network resource is heavily utilized. A bias factor that is less than one (i.e., ζ<1) helps prevent a resource request queue 310 from reaching a maximum throughput. In general, this may lower the utilization of the network resource. To accomplish this, token rate selector 320 may multiply the bias factor by a selected token rate to select a new token rate. Bucket selector 330 may multiply the bias factor by the size of bucket 331 to select a new size for bucket 331. Thus, a bias factor of two (i.e., ζ=2) would double the token rate, size of bucket 331, or both. Bias factors may be assigned individually to each resource request queue based on a profile (e.g., gold, silver, etc.) or other factor (e.g., MCS, QoS, etc.). A single bias factor may be assigned to all resource request queues 310.

Figure 4:
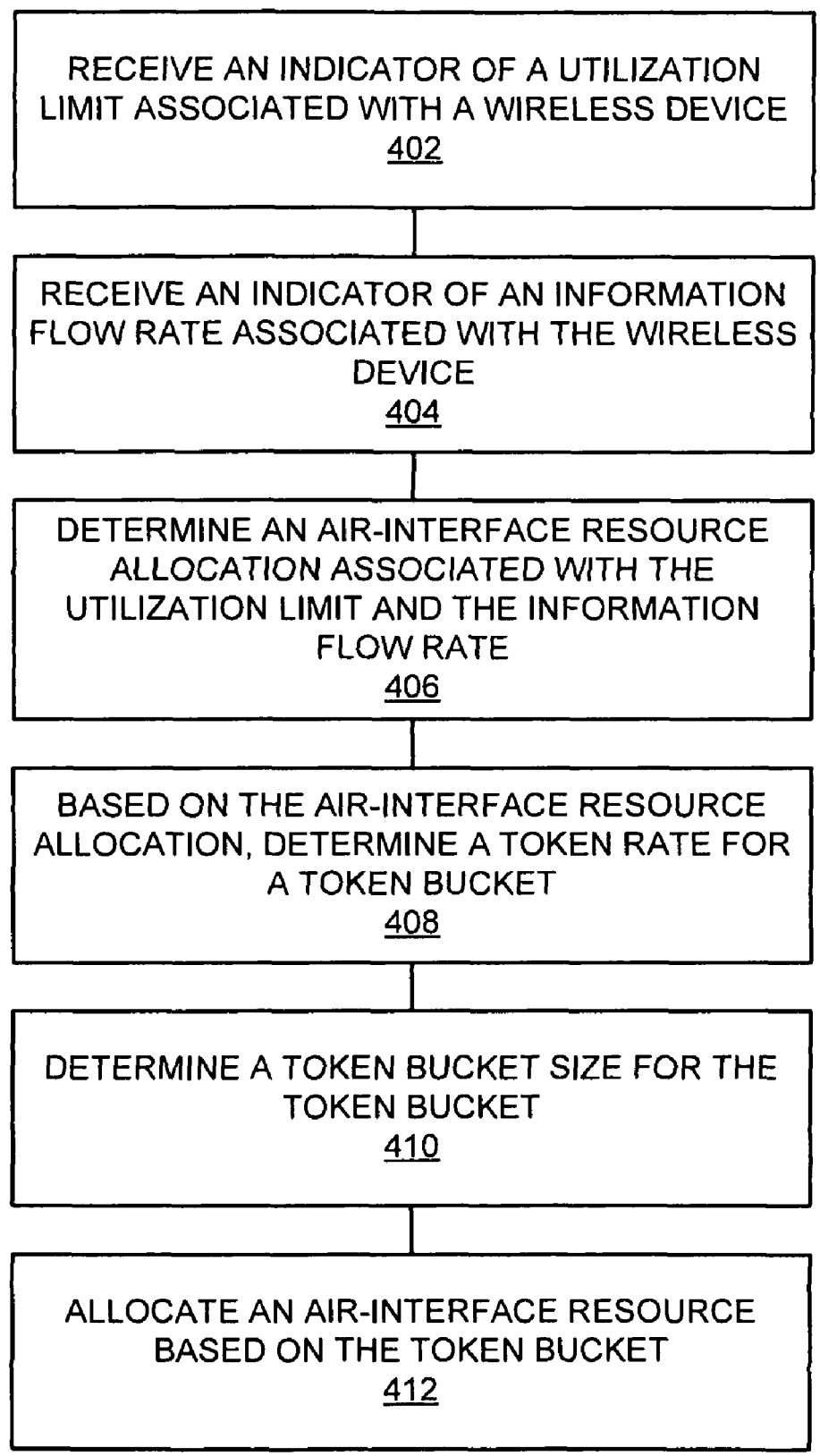
FIG. 4 is a flowchart illustrating a method of operating a communication system.

FIG. 4 is a flowchart illustrating a method of operating a communication system. The steps illustrated in FIG. 4 may be performed by one or more elements of communication system 100 or scheduler 300.

An indicator of a utilization limit associated with a wireless device is received (402). For example, token rate selector 320 may receive an indicator of a maximum throughput for a wireless device that is associated with resource request queue 310. An indicator of an information flow rate associated with the wireless device is received (404). For example, token rate selector 320 may receive an indicator of the number of bits per slot carried by a modulation and coding scheme being used by a wireless device that is associated with resource request queue 310.

An air-interface resource allocation associated with the utilization limit and the information flow rate is determined (406). For example, token rate selector 320 may determine the number of slots per second that corresponds to the air-interface carrying the maximum throughput using the modulation and coding scheme that is associated with a wireless device that is also associated with resource request queue 310. Based on the air-interface resource allocation, a token rate for a token bucket is determined (408). For example, based on the number of slots per second determined in block 406, and a network resource utilization factor, token rate selector 320 may determine a token rate.

A token bucket size for the token bucket is determined (410). For example, bucket selector 330 may determine a size for bucket 331 based on the token rate. In another example, bucket selector 330 may determine a size for bucket 331 based on a profile that is associated with resource request queue 310. In another example, bucket selector 330 may determine a size for bucket 331 based on a network utilization factor. An air-interface resource is allocated based on the token bucket (412). For example, map generator 350 may allocate uplink and/or downlink slots based on allocations 345 received. These allocations 345 may be received by map generator 350 based on bucket 331 and gating function 335.

The methods, systems, networks, devices, base stations, queues, functions, and schedulers described above may be implemented with, contain, or be executed by one or more computer systems. The methods described above may also be stored on a computer readable medium. Many of the elements of communication network 100 and scheduler 300 may be, comprise, include, or be performed by, computers systems. This includes, but is not limited to: communication systems 100, scheduler 300, base station 110, network 120, wireless device 130, wireless device 131, wireless device 132, resource request queue 310, token rate selector 320, bucket selector 330, bucket 331, gating function 335, granted allocation queues 340-342, and map generator 350.

Figure 5:
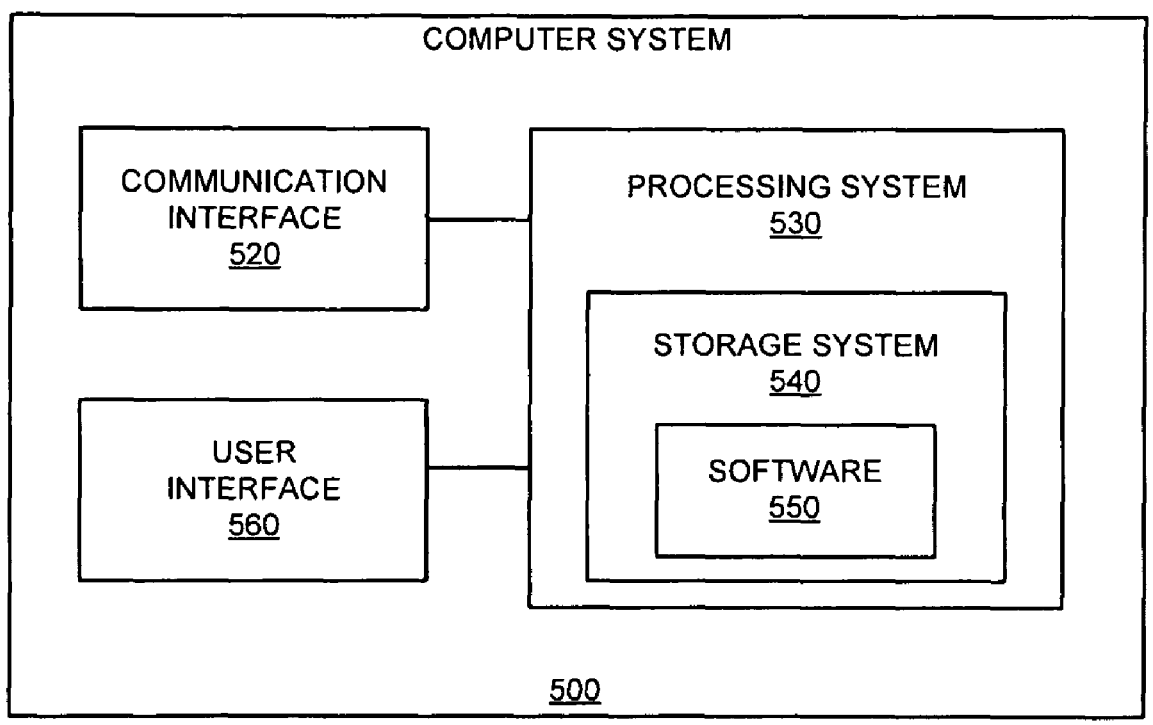
FIG. 5 is a block diagram of a computer system.

FIG. 5 illustrates a block diagram of a computer system. Computer system 500 includes communication interface 520, processing system 530, and user interface 560. Processing system 530 includes storage system 540. Storage system 540 stores software 550. Processing system 530 is linked to communication interface 520 and user interface 560. Computer system 500 could be comprised of a programmed general-purpose computer, although those skilled in the art will appreciate that programmable or special purpose circuitry and equipment may be used. Computer system 500 may be distributed among multiple devices that together comprise elements 520-560.

Communication interface 520 could comprise a network interface, modem, port, transceiver, or some other communication device. Communication interface 520 may be distributed among multiple communication devices. Processing system 530 could comprise a computer microprocessor, logic circuit, or some other processing device. Processing system 530 may be distributed among multiple processing devices. User interface 560 could comprise a keyboard, mouse, voice recognition interface, microphone and speakers, graphical display, touch screen, or some other type of user device. User interface 560 may be distributed among multiple user devices. Storage system 540 could comprise a disk, tape, integrated circuit, server, or some other memory device. Storage system 540 may be distributed among multiple memory devices.

Processing system 530 retrieves and executes software 550 from storage system 540. Software 550 may comprise an operating system, utilities, drivers, networking software, and other software typically loaded onto a computer system. Software 550 could comprise an application program, firmware, or some other form of machine-readable processing instructions. When executed by processing system 530, software 550 directs processing system 530 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of scheduling air-interface resources, comprising:
   receiving a throughput indicator associated with a wireless device to which a gateway provides an air interface;
   receiving a modulation and coding scheme indicator, the modulation and coding scheme indicator being associated with a modulation and coding scheme used by the wireless device;
   based on the modulation and coding scheme indicator, selecting a token bucket size for a token bucket;
   based on the throughput indicator and the modulation and coding scheme indicator, selecting a token rate for the token bucket; and
   allocating an air-interface resource to the wireless device based on the token bucket size and the token rate of the token bucket, one or more of the token bucket size and the token rate being determined based on a priority associated with the wireless device with respect to other wireless devices to which the gateway provides an air interface.

2. The method of claim 1, wherein the selecting the token bucket size is further based on a quality of service indicator associated with the wireless device.

3. The method of claim 1, wherein the selecting the token bucket size is further based on an indicator of air-interface utilization.

4. The method of claim 3, wherein the selecting the token rate is further based on the indicator of air-interface utilization.

5. The method of claim 3, wherein the selecting the token rate is based on a quality of service indicator associated with the wireless device.

6. The method of claim 1, wherein selecting the token bucket size is further based on a burst size.

7. The method of claim 6, wherein the burst size is based on the modulation and coding scheme indicator.

8. The method of claim 6, wherein the burst size is based on a quality of service indicator associated with the wireless device.

9. A method of regulating a utilization of air-interface resources, comprising:
   receiving an indicator of a utilization limit associated with a wireless device to which a gateway provides an air interface;
   receiving an indicator of an information flow rate associated with the wireless device;
   determining an air-interface resource allocation associated with the utilization limit and the information flow rate;

based on the air-interface resource allocation associated with the utilization limit and the information flow rate, determining a token rate for a token bucket associated with the wireless device;

determining a token bucket size for the token bucket; and, based on the token rate of the token bucket and the token bucket size, allocating an air-interface resource to the wireless device, one or more of the token rate and the token bucket size being determined based on a priority associated with the wireless device with respect to other wireless devices to which the gateway provides an air interface, allocating an air-interface resource to the wireless device.

10. The method of claim 9, wherein the token bucket size is based on the indicator of information flow rate.

11. The method of claim 9, wherein the token bucket size is based on a quality of service associated with the wireless device.

12. The method of claim 9, wherein the token bucket size is based on an air-interface utilization.

13. The method of claim 9, wherein the token rate is further based on a quality of service associated with the wireless device.

14. The method of claim 9, wherein the token rate is based on an air-interface utilization.

15. The method of claim 9, wherein the utilization limit is based on a quality of service associated with the wireless device.

16. The method of claim 9, wherein the information flow rate is based on a modulation and coding scheme recently used by the wireless device.

17. A communication system, comprising:

a gateway providing an air-interface to communicate with a wireless device, the wireless device being associated with an air-interface utilization limit, the gateway allocating an air-interface resource to the wireless device based on a token bucket rate and a token bucket size of a token bucket, the gateway determining the token bucket rate for the token bucket based on the air-interface utilization limit and an information flow rate associated with the wireless device, and the gateway determining the token bucket size for the token bucket based on a selected burst size, one or more of the token rate and the token bucket size being determined based on a priority associated with the wireless device with respect to other wireless devices to which the access node provides an air interface.

18. The communication system of claim 17, wherein the selected burst size is based on a quality of service associated with the wireless device.

19. The communication system of claim 17, wherein the selected burst size is based on the air-interface utilization limit.

20. The communication system of claim 17, wherein the token bucket size is based on a quality of service associated with the wireless device.

* * * * *